Dec. 3, 1963

D. H. IMHOFF ETAL 3,113,082

HEAT GENERATION

Filed April 29, 1954

INVENTORS
Donald H. Imhoff
Wesley H. Harker
By
ATTORNEYS

Dec. 3, 1963  D. H. IMHOFF ETAL  3,113,082
HEAT GENERATION
Filed April 29, 1954  3 Sheets-Sheet 2
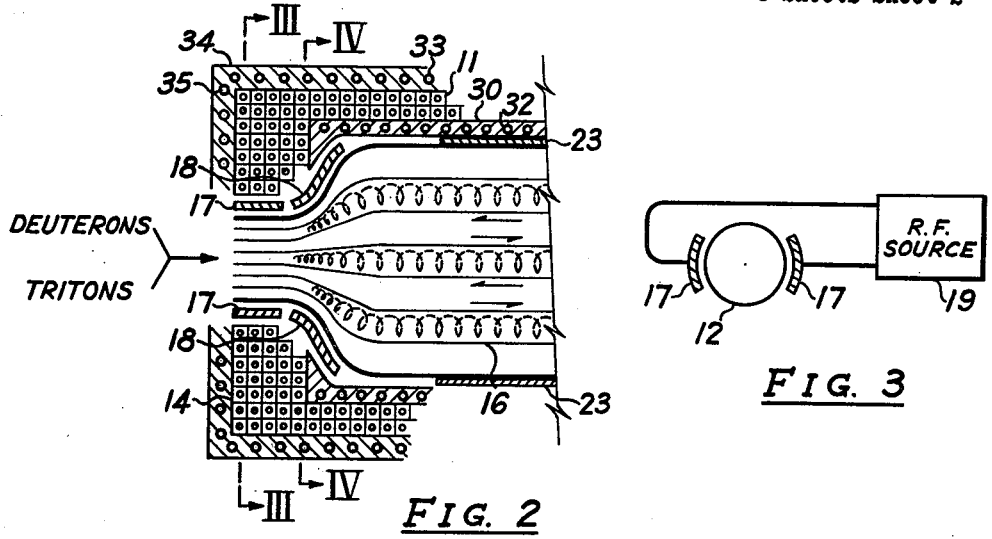
FIG. 2
FIG. 3
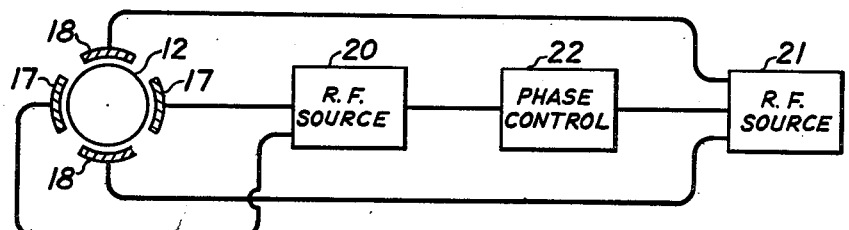
FIG. 4
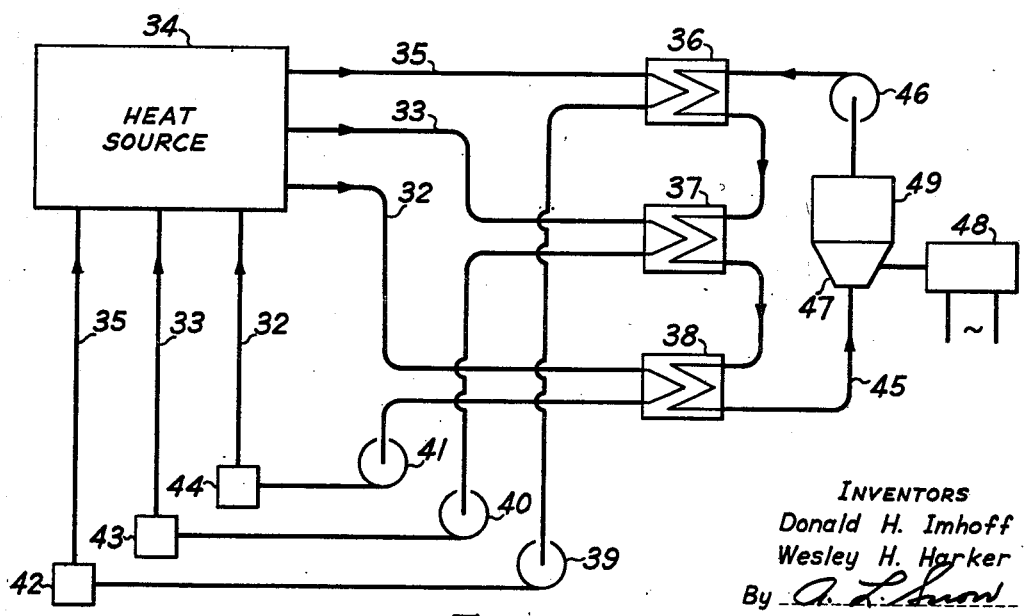
FIG. 7
INVENTORS
Donald H. Imhoff
Wesley H. Harker
By
ATTORNEYS Dec. 3, 1963    D. H. IMHOFF ETAL    3,113,082
HEAT GENERATION
Filed April 29, 1954    3 Sheets-Sheet 3

INVENTERS
Donald H. Imhoff
Wesley H. Harker
By
ATTORNEYS 3,113,082
HEAT GENERATION
Donald H. Imhoff, Walnut Creek, and Wesley H. Harker, Livermore, Calif., assignors, by mesne assignments, to the United States of America as represented by the United States Atomic Energy Commission
Filed Apr. 29, 1954, Ser. No. 426,353
21 Claims. (Cl. 204—154.2)

This invention relates to the generation and controlled action of an intense flux of fast or high-energy neutrons upon source-fissionable materials, exemplified by uranium 238 and thorium 232 as contrasted with thermally fissionable materials such as uranium 235 and plutonium 239, that are fissionable by slow or thermal neutrons.

Heretofore it has been proposed to utilize readily or thermally fissionable materials such as uranium 235 or plutonium 239, both of which may be fissioned by thermal neutrons in the 0.025 ev. energy range, for heat production in a critical atomic pile or reactor. Heat is withdrawn from the reactor by a suitable circulating fluid such as light or heavy water, liquid metals or fused salts, the fluid subsequently being passed through a steam generator whose output is used to drive prime movers such as turboelectric generators. The original installation, as well as the continued operation of such units, is extremely expensive due to the large inventory and the scarcity of the fuel materials required, and the necessity of frequent and costly processing to restore reactivity by removal of fission products. In addition, the operation is hazardous due to the possibility of the reactor becoming unstable with the release of large amounts of energy and quantities of radioactive byproducts.

It is an object of this invention to provide an improved method of generating fast neutrons from a nuclear reaction zone of the hydrogen isotope type, utilizing the fast or high energy neutrons created by said reaction.

Another object is to provide a method of producing nuclear reactions in source-fissionable materials utilizing high-energy neutrons created by a nuclear reaction of the hydrogen isotope type, in a moderated blanket with intermediate production of thermally fissionable material which is consumed in situ in the blanket.

Another object is to provide an improved method of producing neutrons from deuterium, lithium and source-fissionable materials, as contrasted to thermally fissionable substances.

Another object is to provide an improved method of producing nuclear fission which is initiated and maintained by a driven neutron-generating hydrogen isotope nuclear reaction as distinguished from a spontaneous or controlled reaction whereby the operating hazards of the nuclear reaction system are reduced.

Another object is to provide a method of producing neutrons in a neutron-producing hydrogen isotope nuclear reaction zone which will be at least partially independent of an external supply of one of its reactive source materials; for example, tritium, by continuously forming such material from a readily available substance during normal operation of the method.

Another object is to provide an improved method of of producing tritium.

Another object is to provide an improved method of generating fast or high energy neutrons in a particle-producing nuclear reaction in which hydrogen isotopes, e.g., deuterons and tritons, together with neutralizing electrons, are confined within complementary magnetic and oscillating electric fields to produce said fast or high energy neutrons which interact with a moderated blanket of source-fissionable materials and lithium 6.

These and other objects and advantages will be further apparent from the following description and from the attached drawings, which illustrate a preferred embodiment of the invention, together with alternative forms that are useful therein.

This invention may be characterized as providing a method of producing nuclear reactions in deuterium, lithium and source-fissionable materials, preferably natural or depleted uranium, or thorium, by producing high-energy neutrons of about 14 mev. in a deuterium-tritium fast or high energy neutron-producing nuclear reaction zone, effecting neutron multiplication by fast neutron reactions with the source-fissionable material to generate a multiplicity of degraded-energy fast neutrons, moderating the last-named neutrons through resonance capture range of the source-fissionable material to near-thermal energy, whereby a fraction of said moderated neutrons are captured by the source-fissionable material to produce a thermally fissionable material, reacting the moderated near-thermal neutrons with said thermally fissionable material and lithium 6 to form tritium, and introducing at least a part of the tritium so formed into the fast or high energy neutron-producing nuclear reaction zone to replace that consumed therein.

Although the invention is characterized by the foregoing description, it is apparent that a purified form of uranium 238 can also be used as a source-fissionable material and that the lithium can be either natural lithium consisting substantially of lithium 7 with a small proportion of lithium 6, or enriched or purified lithium containing a greater proportion of lithium 6. Also, fast or high-energy neutrons ranging down to about 3 mev. from other than a deuterium-tritium nuclear reaction zone, for example, from a deuterium-deuterium reaction zone, are not precluded since such neutrons down to about 3 mev. can be similarly multiplied, moderated, captured in a source-fissionable material and used in the above-named manner.

If desired, sufficient lithium can be placed in the neutron flux to produce an excess of tritium over that required for maintaining a deuterium-tritium nuclear reaction source for the initial high-energy neutrons.

An example of a method for producing high-energy neutrons by the deuterium-tritium nuclear reaction is described and claimed in our copending patent application Serial No. 422,846, filed April 13, 1954, and entitled "Method of Producing Neutrons," the disclosure of which is incorporated herein by reference. The neutron flux-producing methods of that application may be characterized as including the steps of injecting reactive charged particles such as deuterons and tritons, and neutralizing particles such as electrons, all at predetermined energies, into a reaction zone within a longitudinally varying or asymmetrical magnetic field and imparting a controlled rotational energy to the reactive particles by the imposition of oscillating transverse electrical fields upon selected portions of said reaction zone, to confine the particles therein under such conditions that a nuclear reaction occurs with the release of an intense flux of high-energy (about 14 mev.) neutrons. A further description of an example illustrating this method will be given in the following paragraphs.

More specifically, the present invention may be characterized by the steps of surrounding at least a part of a driven, high-energy neutron-emitting, nuclear reaction zone with a blanket zone containing a moderator such as beryllium, beryllium oxide, graphite and the like within which are distributed suitably jacketed or clad elements of a source-fissionable material; for example, natural or depleted uranium, uranium 238, or thorium 232, and lithium, which may be in its natural form, consisting mainly of lithium 7 with a small percentage of lithium 6, or lithium which has been enriched in the lithium 6 fraction, so proportioned and arranged as to provide for adequate exposure to the neutron flux within the blanket, and for substantially uniform reactivity throughout the life of the unit. Heat is withdrawn from the blanket zone by suitable circulating fluids; for example, liquid metals such as sodium or bismuth, fused salts, light or heavy water or a gas such as helium.

The positioning of the lithium component of the blanket is desirably arranged so that it may be periodically removed from the blanket for processing to recover the tritium produced therein, particularly where that hydrogen isotope is required for replacing that consumed in the deuterium-tritium reaction of the nuclear reaction zone. The other fuel elements are preferably jacketed and placed so that they may be permitted to remain in situ in the blanket for extended periods, measured in years, during which time they will continue to retain fission products and permit a high degree of burnup of even small proportions of thermally fissionable materials which may be present or be formed therein; for example, uranium 235, plutonium 239, or uranium 233, depending upon the type of source-fissionable material originally installed.

A nuclear hydrogen isotope reaction for generating high-energy neutrons essential to the present invention desirably is a driven or particle-producing nuclear reaction of the hydrogen isotope type exemplified in our copending patent application Serial No. 422,846, mentioned above; consequently, the disclosure of said application is incorporated herein by reference. For convenience, it is believed desirable to incorporate substantial portions of that application directly herein, as well as by reference, to clarify the detailed description of the present invention.

A primary requirement in controlling the travel of the several particles within a confining magnetic field is the maintenance of a sufficiently high ratio of rotational energy ($E_r$) to translational energy ($E_z$) to produce a particle-reflecting action between magnetic mirrors or reflectors at the ends of the reaction zone. The transverse accelerating electrical fields, which may take a variety of forms, act to impart this rotational energy and thereby to maintain this ratio at a desirable level.

During the passage of the particles throughout the reaction zone, they are scattered by collisions with other reactive particles so that the ratio of rotational to translation energy tends to decrease with time. In addition to energy transfers between the heavy reacting particles due to collisions with each other, energy is constantly lost from the particles by collisions with electrons. The electrons themselves give up their energy primarily by radiation processes. Since the rate of energy lost from the electrons is proportional to their total energy while the rate of transfer of energy from the positive particles is substantially proportional to the difference between the energies of those particles and the electrons, the net result is that the average energy of the positive particles will be higher than that of the electrons. As these interactions occur, the deuterons and tritons, which may have been originally injected at substantially the same energy level as the electrons, give up a part of their energy to those electrons which have been degraded in energy by the radiation processes just mentioned.

The addition of the rotational component by the oscillating electrical fields adds energy to the system at a point where its utility is greatest; i.e., to maintain the required ratio of rotational ($E_r$) to translational ($E_z$) energy at a desired value. If this ratio is equal to or greater than the quantity $$\frac{H_o}{H-H_o}$$

where $H_o$ and $H$ are the magnetic field strengths expressed in gausses in the central section and the terminally concentrated sections, respectively, of the magnetic field, the particles will be reflected from the magnetic mirrors which are created by the concentrated fields at the ends of the reaction zone and hence will be confined within the system.

Heretofore, the proposed thermonuclear reaction systems which may be described as controlled, as distinguished from the present system which is driven, were dependent upon the energy release of the reaction to maintain the energy level of the system at a point where the thermonuclear reaction could be sustained. In a controlled reaction of that type, it is necessary that the internal energy generation of the reacting particles be high enough to exceed the loss of energy from the system by electron radiations and other processes; e.g., diffusion of particles out of the reaction zone. In general, this condition requires a very great energy content per unit volume of particles. Under these conditions, if the internal energy generation rate rises even slightly above that necessary to maintain the system in a steady state, the reaction may become unstable and destructive.

This invention, however, drives the hydrogen isotope nuclear reaction rate independently or externally of energy loss by (1) maintaining the energy levels of the system at the desired value by adjusting the energy of the injected particles and (2) adding energy to the system by means of the oscillating electrical fields.

One example of an arrangement for confining the several particles (deuterons, tritons and electrons) under such conditions that they will react to produce primarily an intense flux of fast neutrons, is an axially symmetrical and preferably elongated magnetic field with localized high intensity magnetic fields at each end of the reaction zone to produce what may be designated magnetic reflectors or mirrors, or, more simply, a longitudinally asymmetrical or varying magnetic field. Ionized particles of deuterium and tritium and a supply of electrons are created at suitable energy levels; for example, 20 to 50 kev., by appropriate ion generators and accelerators known in this art. The particles of opposite polarity are injected axially into opposite ends of the magnetic system described above and are initially deflected therein by imposing oscillating electric fields in accordance with this invention to produce a helical motion at the required ratio of rotational to translational energy $$\left(\frac{E_r}{E_z}\right)$$

greater than about 0.5 to obtain the desired particle confinement.

The transverse oscillating electric fields at the ends of the reaction zone may be considered as subdivided into an injection field and a reflection-enhancing field. The injection field would normally be placed across the most highly concentrated magnetic field and would act to impart an initial rotation to the injected particles entering along the axis of the magnetic field. The reflection-enhancing field, on the other hand, is desirably placed in a zone of the magnetic gradient between the uniform magnetic field $H_o$ surrounding the main part of the reaction zone and the concentrated magnetic field $H$ at the extreme end of said zone. These transverse electric fields may be of different frequencies and potentials to obtain the desired effect of permitting the charged particles to be introduced into the reaction zone and then to cause them to be reflected backwardly and forwardly between the magnetic mirrors at the ends of said zone. In addition, the frequency of excitation of the fields must be chosen so that there will be present resonant frequencies for both the tritons and deuterons. The mass of the neutralizing electrons is such that it is usually not feasible to impose a field which will selectively impart a rotational component to those particles.

The net effect of the uniform and concentrated magnetic fields and the transverse reflection-enhancing electric fields is to produce multiple reflections and to direct each particle along a confined path of a generally helical nature within the reaction zone so that it may react with another charged particle. The particles will travel at different rates and in different orbits due to their differing masses, energies, and degree of randomization, which will increase the number of nuclear events and raise the efficiency of the system for the production of fast neutrons.

In the drawings, FIGURE 1 is a diagrammatic longitudinal sectional view illustrating the principle of this invention and a preferred mode for carrying it out.

FIGURE 2 is a diagrammatic longitudinal sectional view of one end of the system shown in FIGURE 1, with an alternative arrangement for imposing an additional rotation-enhancing electrical field on the central portion of the reaction zone.

FIGURE 3 is a transverse sectional view on line III—III of the arrangement of FIGURE 2.

FIGURE 4 is a transverse sectional view on line IV—IV of the arrangement of FIGURE 2.

FIGURE 7 is a diagrammatic view of an entire heat-producing installation, showing a desirable arrangement of heat transfer and heat-utilization means.

Figure 1:
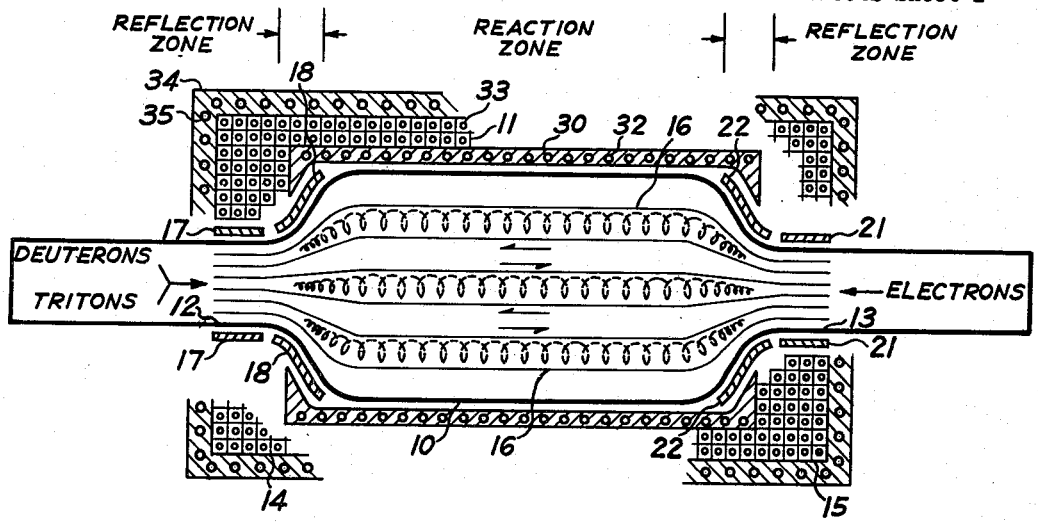

Referring to FIGURE 1 of the drawings, there is illustrated generally an evacuated reaction zone 10 formed within a vessel made of a refractory nonmagnetic material, preferably of low dielectric constant, and surrounded throughout its cylindrical portion by a winding 11 energized from a suitable direct current source (not shown) to give a substantially uniform elongated magnetic field $H_o$ throughout the zone. The ends 12 and 13 of zone 10 are desirably decreased in diameter, as shown, and a greater number of turns of the winding 11 are placed around these portions, as at 14 and 15, to give a higher intensity magnetic field H at both ends of the zone. Alternatively, these end portions could be separately energized to give a higher intensity field H. This arrangement may be characterized as providing an axially symmetrical, terminally concentrated magnetic field for reaction zone 10. The result of this arrangement will give a longitudinally varying internal magnetic field distribution within zone 10 substantially as represented by field lines 16, which are relatively far apart throughout the major portion of the zone and approach closely together at the ends thereof.

In this example, reactive charged particles of deuterons and tritons are illustrated as being introduced together into the restricted end portion 12 of zone 10 from any suitable type of ion injector. Desirably, these positively charged particles are injected axially into the zone with a predetermined energy content of about 20 to 50 kev. The space charge between the particles as they enter the zone and the forces between their charges and the diverging magnetic field lines, will impart some rotational energy to the particles in addition to the axial or translational energy with which they are introduced into the zone. In accordance with this invention, this rotational energy is enhanced to meet the critical $$\frac{E_r}{E_z}$$

ratio described above by providing a transverse electric field between opposed sets of electrodes 17, in this case diametrically spaced across the entrance 12 of zone 10. These sets of electrodes are suitably energized through a phasing network by a radio-frequency source generally designated 19 (FIGURE 3) at frequencies approximating the cyclotron frequencies of the particles.

The cyclotron frequency may be defined as that rate with which the particles will traverse circular orbits in a uniform magnetic field if no perturbing forces were present. Its numerical value may be expressed as the product of the charge-to-mass ratio of the particle and the magnetic field strength in appropriate units, In particular, $$2\pi f = \frac{eH}{m}$$

where $f$ is the cyclotron frequency in cycles per second
$e/m$ is the charge-to-mass ratio of the particle in e.s.u.
$H$ is the magnetic field strength in e.s.u.

For example, if $e/m$ is $1.5 \times 10^{14}$ e.s.u./gm. for deuterons and H is 10,000 gauss, then the cyclotron frequency will be 8 megacycles.

To further enhance this rotation throughout at least a part of the magnetic gradient between the largest diameter of zone 10 and the restricted end portions thereof, an additional set of electrodes 18 is provided which may be designated rotation-enhancing electrodes. These are phased properly with respect to electrodes 17 previously mentioned and are energized from appropriate radio-frequency sources 20 and 21 through phase control means generally designated 22. Although electrodes 17 and 18 are illustrated generally in FIGURE 4 as being in quadrature, this is merely for purpose of illustration, and they need not necessarily be related in that fashion.

From the foregoing, it will be apparent that means have been provided for the practice of this invention to introduce and to facilitate the reflection of charged particles within a zone where the fast neutron producing nuclear reaction may occur.

An essential feature of the uniform magnetic field which surrounds the major portion of zone 10 to confine the paths of the particles traversing that zone is maintenance of a minimum value of that field. Expressed mathematically:

$$\frac{H_o^2}{8\pi} \geq 2nKT$$

where $H_o$ is the value of the magnetic field
$n$ is the density of the particles per unit volume
$K$ is the Boltzmann constant, and
$T$ is the temperature, all in consistent units.

It is desirable to keep $H_o$ at a low value so that the frequency of the transverse electrical fields may also be kept low. However, to obtain confinement of the particles within zone 10, the stored energy of the magnetic field must be equal to or greater than twice the stored kinetic energy of the particles in the zone.

The ratio between the magnetic field strengths in the particle-reflecting portions of the field at the ends of zone 10 to the strength in the uniform field portion of the zone ($H_o$) should preferably be about three. For example, for a deuteron and triton particle density of between $2 \times 10^{12}$ to $2 \times 10^{14}$ particles per cubic centimeter each, the minimum value of $H_o$ should be 6,300 gauss, making the minimum value of H about 19,000 gauss.

In the operation of this invention, a given particle may have its $$\frac{E_r}{E_z}$$

ratio greater than about .5, so that $H_o$, the uniform magnetic field of zone 10, is adequate for confinement during the traverse of that zone by the particle. If the $$\frac{E_r}{E_z}$$

ratio falls below about .5, plates 18 of the rotation-enhancing transverse electrical field will increase that ratio as outlined above so that the magnetic field gradient within the reflection zones at the ends of reaction zone 10 will be effective to return that particle along its helical path for its ultimate collision and fusion with another reactive charged particle. Under some circumstances sufficient losses may take place within the uniform section of zone 10, particularly if that zone is quite long, to bring the $$\frac{E_r}{E_z}$$

ratio below its critical value. In these cases a supplemental transverse electrical field may be imposed across zone 10 at an intermediate point; for example, by means of an opposed set of electrodes 23 (FIGURE 2). This would be appropriately driven by a radio-frequency source (not shown) and suitably phased with respect to the driving means for electrode sets 17 and 18 at the ends of the zone.

The net result is the production of a confined body of deuterons, tritons and neutralizing electrons which will react as outlined above probably to form helium with the release of high energy neutrons and alpha particles. The neutrons will escape through the vessel wall and the magnetic windings surrounding the zone and may be utilized for any desired purpose, such as conversion into heat for the production of power.

Thus, there has been provided around the reaction zone 10 an elongated magnetic field to produce what may be characterized as a longitudinally variable, or, more specifically, an axially symmetrical, terminally concentrated magnetic field. The more intense magnetic field mirrors or reflectors cooperate with the transverse electric fields not only to permit the reacting particles of deuterons, tritons and electrons to be introduced into the system comprising evacuated zone 10, but also to impart to those particles a controlled helical motion which confines their paths within the zone and causes them to be reflected between the ends of the zone until sufficient nuclear events occur to produce the high energy neutrons which are multiplied in accordance with the object of this invention.

Figure 5:
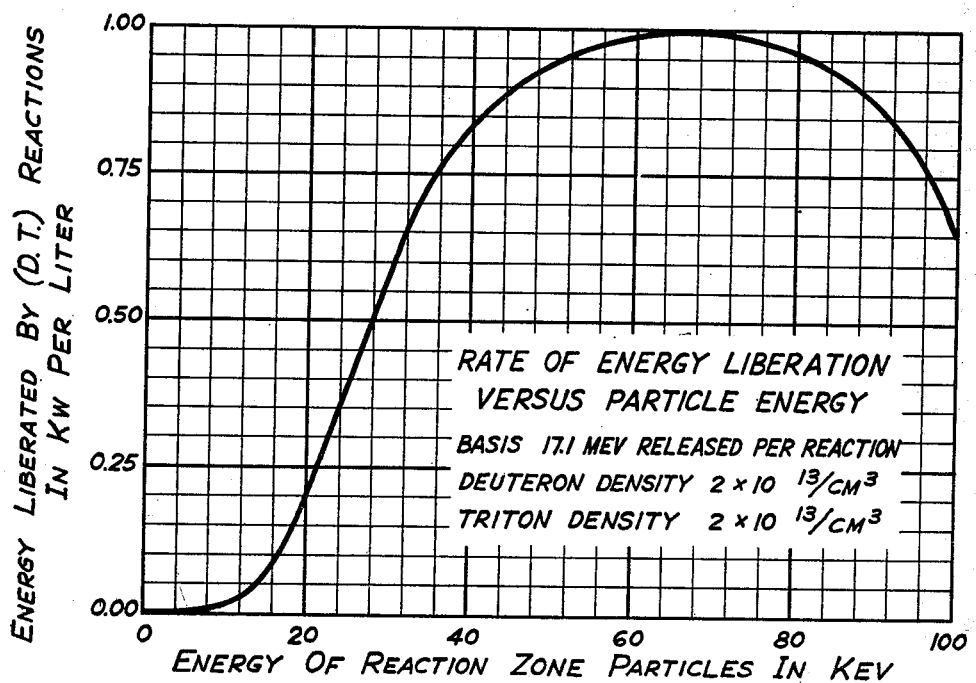
FIGURE 5 is a chart comparing the rate of energy liberation of the system with the energy of the reaction zone particles based on the introduction of monoenergetic particles.

Referring now to FIGURE 5, a comparison is there shown between the rate of energy liberation from zone 10 and the reaction zone particles for various energy levels of the latter. From this curve it is apparent that a desirable range for the introduction and subsequent maintenance of energy of the deuterons, tritons and preferably also the electrons, lies between about 40 and 100 kev. The advantages of operating within this range will be further apparent from the following specific example of a system which has been generally described above. In this illustrative example, zone 10 would have a straight cylindrical portion about two meters in diameter and about ten meters long with a uniform magnetic field of about 15,000 gauss, increasing at the ends 12 and 13 to about three times that field strength. Deuterons and tritons at about 20–60 kev. would be introduced through end 12 at a rate to maintain a particle density of about $2 \times 10^{13}/cm.^3$ in the reaction zone, and an appropriate flux of electrons at about the same energy would be injected into end 13 of zone 10. The derivation for the curve of FIGURE 5 is given below:

The (D,T) nuclear reaction rate for monoenergetic particles can be estimated for such a cylindrical velocity distribution as follows:

$$N = \frac{n_d n_t}{\pi} \int_0^\pi \sigma(E_r) v_r d\theta$$

where

N is the reaction rate in number per cm.$^3$ per sec.
$n_d$, $n_t$ is the number of deuterons and tritons per cm.$^3$
$\sigma(E_r)$ is the (D,T) cross section as a function of the relative energy.
$v_r$ is the relative velocity of the two particles.
$d\theta$ is angular distribution of velocity vector.

This reaction rate as a function of injected particle energy is plotted in FIGURE 5. It can be seen that the maximum reaction rate occurs at an incident particle energy of approximately 60–70 kev. This does not necessarily represent the optimum injection energy, however, since the energy that would represent the maximum actual yield per unit of energy input to the system would be more pertinent. However, since the energy dependence of the various system losses as well as the actual relaxed energy distribution of the incident particles is not known, a value of 60 kev. injection energy may be assumed.

An interesting aspect when the injection of the reactant particles is accomplished at energies upwards of 60 kev. lies in the control characteristics of such a system. It can be seen from FIGURE 5 that if the temperature of the system did increase suddenly from accumulation of energy within the system, the reaction rate would decrease, thus yielding a negative temperature coefficient. In contrast, other thermonuclear proposals rely on much lower operating energies, and at these temperatures the reaction rate increases rapidly with increasing temperature. Such a situation for "controlled" thermonuclear systems may present serious control and hazard difficulties.

Referring again to FIGURE 1, there is shown a blanket zone 30 surrounding the nuclear hydrogen isotope type reaction zone 10, the blanket material being a source-fissionable material, for example depleted uranium, with which is incorporated a moderator such as beryllium oxide. These may be in a mechanical mixture, or fabricated into plates, pellets, slugs or blocks, and arranged or spaced in a suitable geometrical pattern, to meet the several design conditions, including ratio of moderator to source-fissionable materials, which will be understood by one skilled in this art. To provide for corrosion protection as well as for long-time containment of fission product, the source-fissionable material should preferably be canned or jacketed with known materials for this purpose. Lithium 6 is desirably incorporated in the blanket in natural lithium, and upon conversion to tritium serves as a source to replenish the tritium consumed in the neutron flux-producing fusion reaction in zone 10. To facilitate removal of the lithium component for recovery of its tritium content, it should similarly be sealed and arranged in suitable positions for periodic withdrawal from the blanket zone 30 for processing.

Heat is removed from blanket 30 by the circulation of a suitable fluid, such as liquid metal; for example, bismuth or a eutectic such as Na-K, liquids such as light or heavy water which may also act as a moderator, or gases such as helium which are circulated through conduits or passages 32. Selection of these heat-transfer materials is based upon well understood nuclear, chemical and physical properties and forms no part of this invention.

The arrangement of FIGURE 1 illustrates the blanket zone 30 as substantially surrounding the major portion of hydrogen isotope type reaction zone 10 and positioned inside the winding 11 that is used in this example to produce the magnetic field in that zone. Alternatively, the windings 11 and blanket zone 30 could be reversed, sectionalized, or otherwise modified for convenience in fabrication or to improve the magnetic field and neutron flux relationships. Desirably the windings 11, 14 and 15 are cooled as by fluid-conveying conduits or passages 33 and are surrounded by a shield 34, similarly provided with cooling fluid-conveying conduits or passages 35. Shield 34 may contain neutron reflecting materials, such as beryllium, or beryllium oxide, and may also act as a biological or personnel-protecting unit, in which case it may contain ferritic- or barytes-concrete. The geometry of the blanket 30 and reflector or shield 34 is desirably such that the source-fissionable material and any intermediate products therefrom may initially be positioned to favor uniform reactivity and high burn-up with minimized handling or processing of blanket elements during the entire useful life of the installation.

Figure 6:
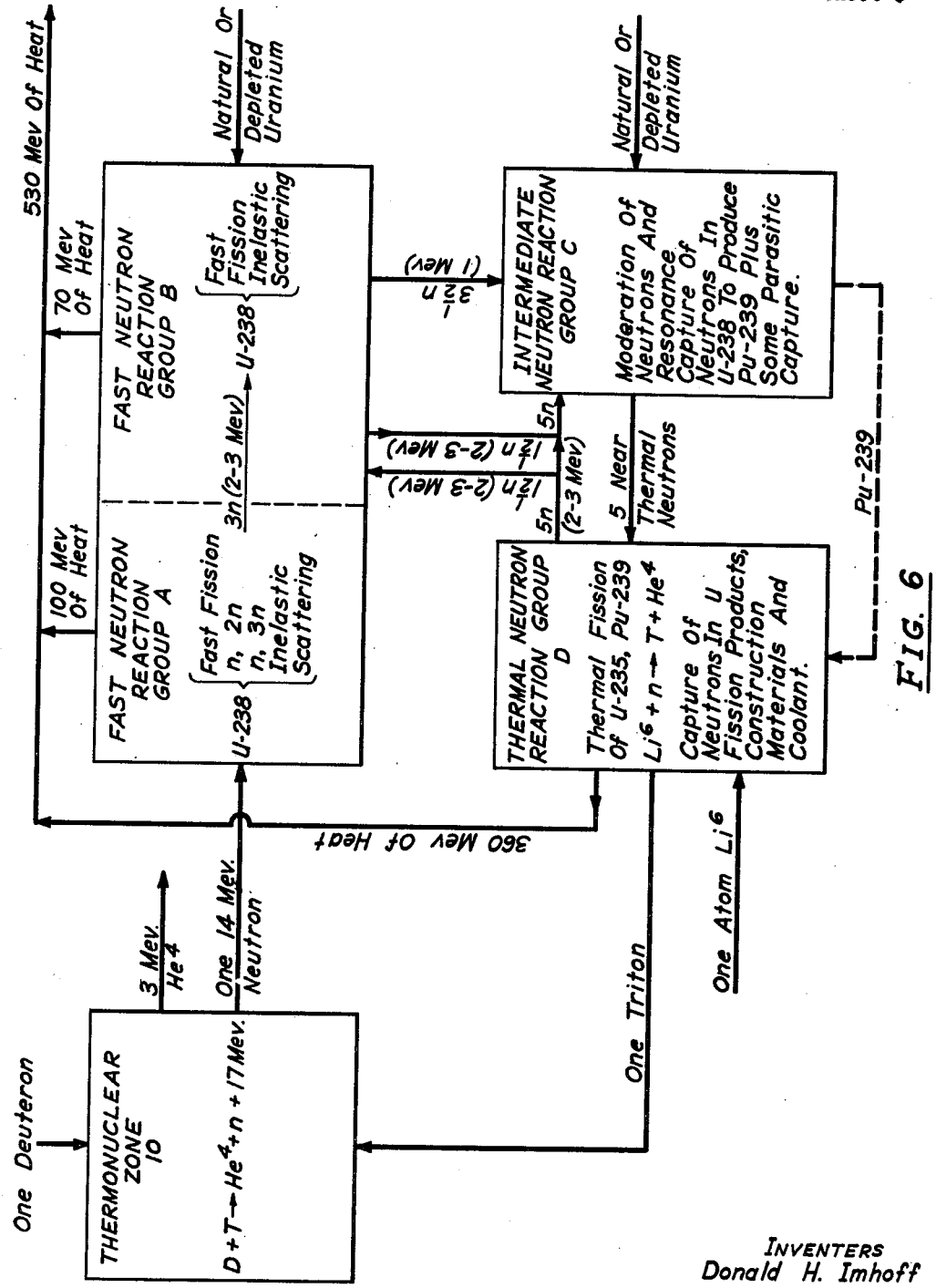
FIGURE 6 is a representative neutron and heat balance diagram that is illustrative of certain intermediate process operations and nuclear events.

A more detailed description of the nuclear reactions effected pursuant to this invention and initiated by the action of the high-energy neutrons on the source-fissionable materials in the moderated blanket zone 30 will be found in the following paragraphs and FIGURE 6, which is a schematic illustrative diagram showing the principal reactions and approximate neutron and heat energy balance for a typical example of this invention.

The various nuclear reactions occurring in the blanket are broken into four groups in accordance with the average energy levels of the neutrons entering into the reactions. The neutron and heat balance is based on quantities derivable from a single reaction occurring in the hydrogen isotope type nuclear reaction zone between a deuteron and triton producing a 14 mev. neutron and a 3 mev. helium nucleus. The particular scheme presented is one in which optimization is approximated for maximum heat generation and for producing only sufficient tritium from the blanket to replace that consumed in the thermonuclear reaction. The following principal reactions are effected in the blanket:

The 14 mev. neutron impinging upon the blanket undergoes the nuclear reactions indicated in the diagram as Group A. These fast neutron nuclear reactions are primarily with uranium 238 and produce $(n, 2n)$, $(n, 3n)$ neutron multiplication, inelastic scattering, and heat generation by fast fissions. The net result of these competitive reactions is a neutron multiplication in which approximately three neutrons are produced for every one 14 mev. neutron. These three neutrons have an average energy of approximately 0.5 to 3 mev. These neutrons then are competitively distributed between the nuclear reactions indicated in the block diagram by Group B and Group C. Occurring in Group B are essentially more fast neutron reactions and inelastic scattering processes which degrade the neutron energy below the fission threshold of about 1 mev.

These degraded-energy neutrons, plus that fraction of neutrons from reaction Group A which did not enter into reaction Group B, are now subject to moderation and the reactions in Group C. The moderation process is one in which successive elastic collisions are made with a moderating material, such a moderator being a material of low atomic number and chosen from the group consisting of beryllium, beryllium oxide, graphite, heavy water, and the like. The result of these successive collisions with the moderating material is to continually decrease the neutrons' energy from approximately 1 mev. down through the resonance capture regions for source-fissionable material to thermal energies (.025 electron volt). When these neutrons are passing through or reach the resonance capture region, some are captured in uranium 238 to produce plutonium 239. The neutrons resulting from reaction Group C are of approximate thermal energy and enter into the reactions indicated in the diagram as reaction Group D. In reaction Group D, the following competitive reactions occur:

(1) A thermal neutron is captured in lithium 6 to produce a tritium atom and helium 4. This tritium as illustrated is being recycled to the thermonuclear zone.

(2) Consumption by thermal fission of uranium 235 which is present when depleted or natural uranium is used in the blanket.

(3) Consumption by thermal fission of plutonium produced in reaction Group C.

(4) Capture of neutrons in uranium fission products, uranium, construction materials and coolants.

The neutrons produced by the thermal fission of uranium 235 and plutonium 239 are, of course, of fission energy (approximately 2–3 mev.) and themselves proceed through reaction Groups B, C, and D. For the particular example indicated in FIGURE 6, the total amount of heat liberated is approximately 530 mev. per incident 14 mev. neutron from the fussion reaction zone and is produced by the respective neutron reactions as indicated in the drawing.

Referring to FIGURE 7, there is diagrammatically illustrated a typical system for utilizing the heat produced by an example of this method to produce electric power, in which reference numeral 34 illustrates the heat-source enclosing shield previously mentioned, with the several heat-transfer fluid-circulating conduits 32, 33 and 35, leading outwardly therefrom, in this case, respectively, from the blanket zone 30, the field windings 11, 14 and 15 and the shield 34. These conduits may be connected sequentially or otherwise to the heat-exchangers or steam generators 36, 37 and 38, and the several fluid streams may be circulated by means of suitable pumps 39, 40 and 41 through surge chambers 42, 43, and 44 and returned to the several zones of the heat source or generator to withdraw heat therefrom. Water is circulated through system 45 by feed pump 46 to be heated in the several heat exchangers 36, 37 and 38 to form steam which is feed to turbine 47 to drive the electrical generator 48. Condenser 49 returns the condensed water to feed pump 46 in system 45. Indicating and control systems for such an arrangement are conventional and are not shown herein.

From the foregoing description, it will be apparent that new and useful methods have been described which will produce an intense neutron flux, desirably in the range of about 3 to 14 mev. and which may be introduced to react in a suitably shielded and moderated blanket zone of source-fissionable materials to produce heat and neutron multiplication. If desired, it is also contemplated to include lithium in the blanket zone and thereby produce tritium, either as a replacement for that consumed in a D–T reaction zone for fast or high energy neutron production, or as a final end product.

It will be appreciated that numerous changes and modifications could be made from the examples given above without departing from the essential features of this invention, and all such modifications and changes that fall within the scope of the appended claims are intended to be embraced thereby.

We claim:

1. A method which comprises the steps of introducing deuterons and tritons into a hydrogen isotope nuclear reaction zone to produce a controlled flux of high-energy neutrons, introducing said high-energy neutrons into a blanket zone containing lithium, a moderator capable of reducing neutrons in said blanket zone to near-thermal energies, and source-fissionable materials chosen from the group consisting of natural uranium, depleted uranium, uranium 238, and thorium 232 to produce neutron multiplication therein and to convert lithium 6 to tritium, and withdrawing heat from said blanket zone.

2. A method according to claim 1, in which the source-fissionable material is natural uranium.

3. A method according to claim 1, in which the source-fissionable material is depleted uranium.

4. A method according to claim 1, in which the source-fissionable material is thorium 232.

5. A method according to claim 1, in which neutralizing electrons are also introduced into said reaction zone.

6. A method according to claim 1, wherein said moderator is effective to produce neutron capture by said source-fissionable material to form a thermally fissionable material, said last-named material being subsequently consumed in situ in said blanket zone.

7. A method of producing neutron multiplication with fast neutrons from a hydrogen isotope nuclear reaction zone comprising the steps of introducing said fast neutrons into a blanket zone containing a moderator capable of reducing neutrons to near-thermal energies and a source-fissionable material chosen from the group consisting of natural uranium, depleted uranium, uranium 238 and thorium 232, effecting neutron multiplication by fast neutron reactions with said source-fissionable material to release heat energy and a multiplicity of degraded-energy fast neutrons, moderating said last-named neutrons through a resonance capture range of said source-fissionable material to near-thermal energy, whereby a fraction of said moderated neutrons are captured to produce a thermally fissionable material and retaining said last-named material in said blanket zone for a period sufficient to be consumed in situ.

8. A method of producing tritium with fast neutrons from a hydrogen isotope nuclear reaction zone comprising the steps of introducing said fast neutrons into a blanket zone containing lithium, a moderator capable of reducing neutrons to near-thermal energies and a source-fissionable material chosen from the group consisting of natural uranium, depleted uranium, uranium 238 and thorium 232, effecting neutron multiplication by fast neutron reactions with said source-fissionable material to release heat energy and a multiplicity of degraded-energy fast neutrons, moderating said last-named neutrons through a resonance capture range of said source-fissionable material to near-thermal energy, whereby a fraction of said moderated neutrons are captured to produce a thermally fissionable material and whereby near-thermal energy neutrons are captured by lithium 6 to produce tritium, said thermally fissionable material subsequently being consumed in situ by near-thermal neutrons.

9. A method of producing heat and multiplying neutrons with fast neutrons produced in a hydrogen isotope nuclear reaction zone, comprising the steps of introducing them into a blanket zone containing a moderator capable of reducing neutrons to near-thermal energies, and a source-fissionable material chosen from the group consisting of natural and depleted uranium containing uranium 235, and effecting fission in situ of said uranium 235 and thermally fissionable materials produced in said blanket zone with said near-thermal neutrons to produce heat in said blanket zone, and withdrawing heat from said blanket zone.

10. A method of producing heat and multiplying neutrons with fast neutrons produced in a deuterium-tritium nuclear reaction zone, comprising the steps of introducing said fast neutrons into a blanket zone containing a moderator capable of reducing neutrons to near-thermal energies, and a source-fissionable material chosen from the group consisting of natural and depleted uranium containing uranium 235, and effecting fission in situ of said uranium 235 and thermally fissionable materials produced in said blanket with said near-thermal neutrons to produce heat in said blanket zone, and withdrawing heat from said blanket zone.

11. A method of producing tritium which comprises the steps of producing a controlled flux of high-energy neutrons, above about 3 mev., in a hydrogen isotope nuclear reaction zone, introducing said neutrons into a blanket zone containing lithium 6, a moderator, and a source-fissionable material chosen from the group consisting of natural uranium, depleted uranium, uranium 238 and thorium, to effect neutron multiplication therein, said moderator being effective to reduce the energy of said multiplied neutrons in said blanket zone to near-thermal energy, reacting said last-named neutrons with said lithium by neutron capture to produce tritium.

12. A method according to claim 11, in which deuterons and tritons are reacted together with neutralizing electrons in said nuclear reaction zone to produce said high-energy neutrons.

13. A method according to claim 11, in which deuterons and tritons are reacted together with neutralizing electrons in said nuclear fusion reaction zone to produce said high-energy neutrons, and introducing a portion of said tritium into said nuclear reaction zone to replace tritons consumed therein.

14. A method which comprises the steps of introducing reactive charged particles chosen from the group consisting of deuterons and tritons into a confined zone within a magnetic field having longitudinally spaced localized gradients of increasing flux density, imparting an increase of rotational energy to said particles by imposing an oscillating transverse electrical field thereon at substantially the cyclotron frequencies of said particles to confine the paths of said particles in said zone and to release a controlled flux of high-energy neutrons, introducing said neutrons into a blanket zone containing lithium, a moderator capable of reducing neutrons in said blanket zone to near-thermal energies, and source-fissionable materials chosen from the group consisting of natural uranium, depleted uranium, uranium 238, and thorium 232, to produce heat therein and to convert lithium 6 to tritium, and removing heat from said blanket zone.

15. A method according to claim 14, in which neutralizing electrons are also introduced into said confined zone within said magnetic field.

16. A method according to claim 14, in which an oscillating transverse electrical field is imposed at each of said magnetic flux density gradients.

17. A method according to claim 14, in which a succession of oscillating transverse electrical fields are imposed upon said confined zone.

18. A method according to claim 14, in which a portion of the tritium produced in said blanket is introduced into said hydrogen isotope reaction zone.

19. A method according to claim 14, in which thermally fissionable material present and produced in said blanket zone is consumed in situ therein.

20. A method which comprises the steps of introducing deuterons and tritons into a hydrogen isotope nuclear reaction zone to produce a controlled flux of high-energy neutrons, introducing said high-energy neutrons into a blanket zone containing lithium, a moderator and material from the group consisting of uranium and thorium to produce neutron multiplication therein and to convert lithium 6 to tritium.

21. A method which comprises the steps of introducing deuterons and tritons into a hydrogen isotope nuclear reaction zone defined by a magnetic containment field to produce a controlled flux of high-energy neutrons, introducing said high-energy neutrons into a blanket zone containing lithium, a moderator and material from the group consisting of uranium and thorium to produce neutron multiplication therein and to convert lithium 6 to tritium.

References Cited in the file of this patent

UNITED STATES PATENTS

| 2,743,225 | Ohlinger et al. | Apr. 24, 1956 |

FOREIGN PATENTS

| 637,866 | Great Britain | May 31, 1950 |
| 656,398 | Great Britain | Aug. 22, 1951 |
| 706,036 | Great Britain | Mar. 24, 1954 |

OTHER REFERENCES

Proceedings of the Royal Society of London, A 204 (1950), pages 488–495.

Pocket Encyclopedia of Atomic Energy, by Frank Gaynor; Philosophical Library, New York, 1950; pages 74–76.

Nuclear Radiation Physics, by R. E. Lapp and H. L. Andrews, 2nd edition, 1954; Prentice-Hall, New York; pages 303–307.

Nucleonics, February 1956, pp. 42–44.

Nucleonics, June 1956, pp. 36–43, 123.

Physical Review 88 (1952), pages 468–473.

Atomic Industry Reporter News and Analysis, Official Text, Section 1958. Library No. TK 9001 A7. Issue of January 29, 1958, pages 54:5–54:11.

Reviews of Modern Physics, vol. 28, No. 3, July 1956, R. F. Post, pp. 338, 339, 340, 359, 360.